United States Patent [19]
Itoh et al.

[11] Patent Number: 5,503,035
[45] Date of Patent: Apr. 2, 1996

[54] ULTRASONIC FLUID VIBRATING FLOWMETER

[75] Inventors: Ichizo Itoh; Masanori Hondoh; Akio Yasumatsu, all of Tokyo, Japan

[73] Assignee: Yokogawa Electric Corporation, Tokyo, Japan

[21] Appl. No.: 233,148

[22] Filed: Apr. 25, 1994

[30] Foreign Application Priority Data

| May 20, 1993 | [JP] | Japan | 5-118673 |
| Jul. 8, 1993 | [JP] | Japan | 5-169042 |
| Jan. 19, 1994 | [JP] | Japan | 6-004240 |

[51] Int. Cl.$^6$ .................................................. G01F 1/00
[52] U.S. Cl. ........................... 73/861.23; 73/861.19
[58] Field of Search ........................ 73/861.25, 861.19, 73/861.23, 861.28, 861.29, 861.31

[56] References Cited

U.S. PATENT DOCUMENTS

| 4,333,353 | 6/1982 | Baumoel | 73/861.25 |
| 4,391,149 | 7/1983 | Herzel | 73/861.25 |
| 4,751,847 | 6/1988 | Katakura | 73/861.25 |
| 4,825,422 | 4/1989 | Takeda | 73/861.25 |
| 4,934,194 | 6/1990 | Itoh et al. | 73/861.22 |
| 4,947,683 | 8/1990 | Minear et al. | 73/861.25 |
| 5,271,404 | 12/1993 | Corl et al. | 73/861.25 |

Primary Examiner—Richard E. Chilcot, Jr.
Assistant Examiner—R. Biegel
Attorney, Agent, or Firm—Moonray Kojima

[57] ABSTRACT

An ultrasonic fluid vibrating type flowmeter comprising a set of ultrasonic transmitter and ultrasonic receiver mounted on a pipe carrying the fluid whose flow rate is to be measured; driving device for intermittently driving the transmitter using burst waves containing an oscillation frequency to cause the transmitter to apply ultrasonic signals to the fluid and cause its vibration; standard timing device for generating a standard signal to control the timing of the burst waves whereby the receiver receives an amplitude modulated signal whose amplitude is modulated by the frequency modulation caused by vibration of the fluid; and sampling device for sampling an envelope of the amplitude modulated signal in synchronism with the standard signal and at times governed by a predetermined function, whereby the vibration frequency of the fluid is detected from the sampled amplitude modulated envelope while concurrently removing noise influences.

15 Claims, 14 Drawing Sheets

Fig. 13 (a) Fig. 13 (b)
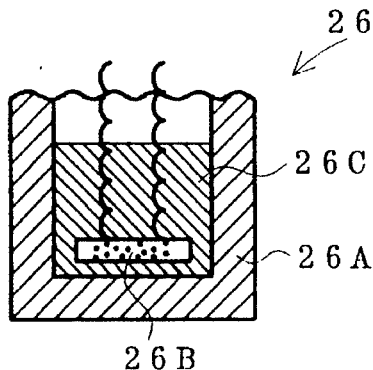
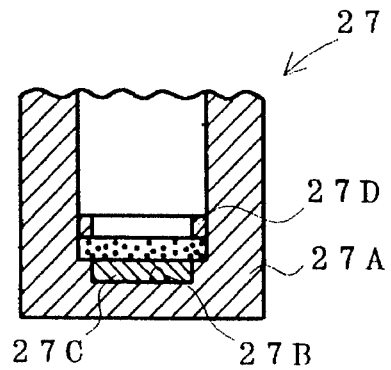
Fig. 14
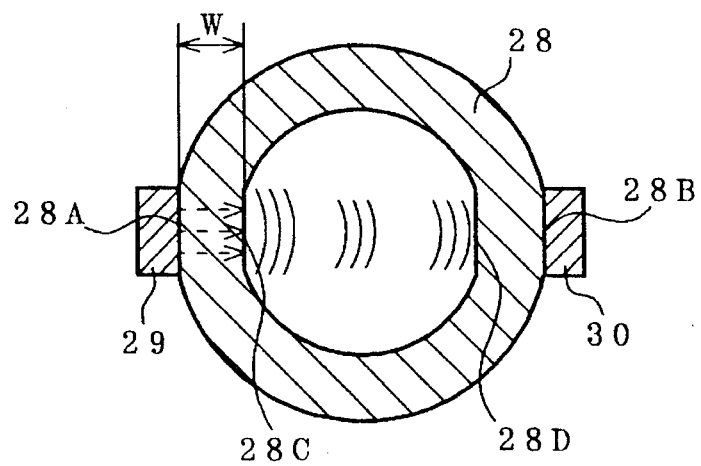
Fig. 15
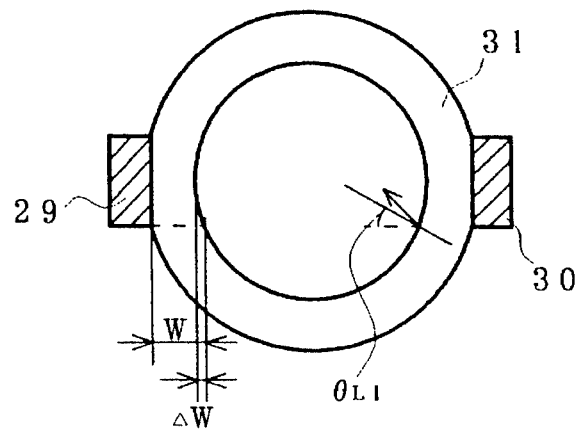

Fig. 19
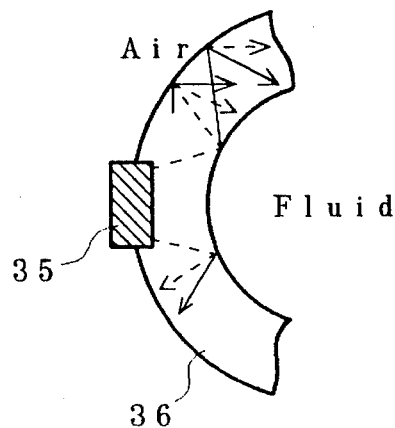
Fig. 20
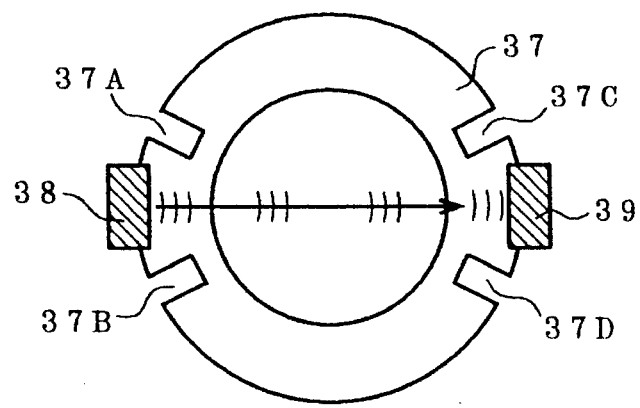
Fig. 21 (a)  Fig. 21 (b)
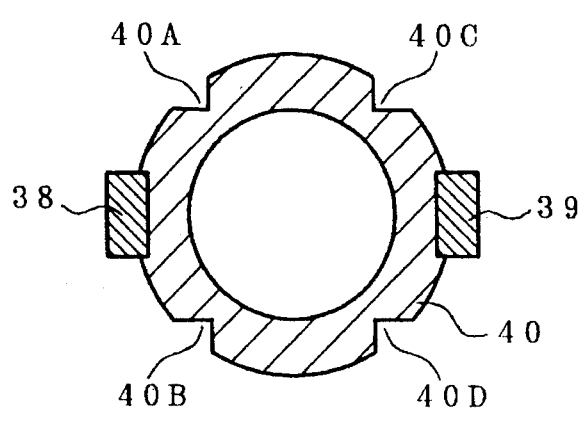 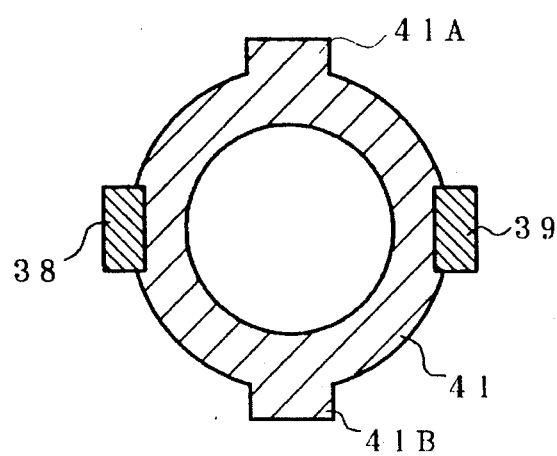

ULTRASONIC FLUID VIBRATING FLOWMETER

BACKGROUND OF THE INVENTION

1. Field of the Invention

This invention relates to an ultrasonic fluid vibrating flowmeter for measuring the flow rate of a fluid; and more particularly, to such a flow meter which is improved to provide stable, substantially noise-free operation.

2. Description of the Prior Art

One type of known fluid vibrating flow meter is the vortex flowmeter which measures the flow rate of a fluid to be measured by using ultrasonic signals to cause vortexes of the fluid (which is one kind of fluid vibration caused when the fluid to be measured contacts a vortex generator) and counting the number of vortexes, whereby the flow rate is measured from the frequency thereof.

Another type of flowmeter is the fluidic flowmeter which measures the flow rate of a fluid to be measured by causing the fluid to be jetted through a nozzle onto a target and then measuring the flow rate by taking the difference of pressures on either side of the jet flow, and by measuring the vibration of the fluid vibration caused by the jet hitting the target by using a piezoelectric sensor located on an inner wall of the pipe carrying the fluid.

In the instant specification, the conventional art will be explained on the basis of the vortex type flowmeter, such as disclosed in Japan UM 48-17010 entitled "Flow Velocity Measuring Device", and illustrated in FIGS. 1–3, wherein FIG. 1 shows the structural features thereof, FIG. 2 shows changes in propagation timing, and FIG. 3 shows components of the flowmeter.

FIG. 1 depicts a conventional vortex type flowmeter wherein a vortex generator 1 is disposed in a fluid flow to generate Karman vortexes, which generator 1 is shown as a columnar object. In FIG. 1 vortexes 2 are generated by vortex generator 1 which is positioned in measuring pipe line 3, through which a fluid to be measured is caused to flow. An ultrasonic receiver 5 and an ultrasonic transmitter 4 are mounted on pipe 3, on the downstream side of generator 1, facing each other and at approximately right angles to the fluid flow direction. These comprise a detector for detecting the number of produced Karman vortexes, that is the number of vortexes which flow per unit time.

If there are no vortexes in the propagation path of the ultrasonic signal, which is shown by the dotted line in FIG. 1, the propagation time $\tau_o$ can be expressed as follows:

$$\tau_o = D/C_A \qquad (1)$$

wherein D is the distance between transmitter 4 and receiver 5, and $C_A$ is the speed of sound within the medium (i.e. fluid).

Next, propagation time $\tau_1$, when Karman vortex exists in this pipe, and when the transmission direction of the ultrasonic signal and the direction of velocity component $V_1$ of the vortex is the same, may be expressed as follows:

$$\tau_1 = [d_v/(C_A + V_1)] + [(D - d_v)/C_A] \qquad (2)$$

wherein $D_v$ is the diameter of the vortex.

Furthermore, the propagation time $\tau_2$, when the Karman vortex exists in this pipe, and when the transmission direction of the ultrasonic signal and the direction of the velocity component $V_2$ of the vortex is opposite, may be expressed as follows:

$$\tau_2 = [d_v/(C_A - V_2)] + [(D - d_v)/C_A] \qquad (3)$$

wherein $d_v$ is the diameter of the vortex.

The above points may be shown as changes of the propagation time of the ultrasonic signal to time as shown in FIG. 2. Then, because the number of times of changes of propagation time of the ultrasonic signal per unit time is equal to the number of vortexes passing through the propagation path, i.e. to the number of produced Karman vortexes, the flow rate of the fluid may be found by counting the changes using a suitable device.

FIG. 3 depicts such a device for counting the mentioned changes, and comprises an electronic circuit 6, containing a pulse generator, amplifier and other components, an FM signal demodulator 7, a counter 8, etc.

Electronic circuit 6 applies a pulse signal to transmitter 4 which then transmits an ultrasonic signal to the vortex. Receiver 5 receives a signal which is modulated by the vortex in response to the ultrasonic signal from the transmitter 4, and then applies a pulse signal $P_o$ through electronic circuit 6.

Pulse signal $P_o$ has a frequency which is reverse-proportional to the total delay time, which corresponds to the sum of the delay time of transmitter 4, the propagation time within the fluid, the delay time of the receiver 5, etc, in the loop of the components.

Because the propagation time within the fluid changes each time the Karman vortex passes, pulse signal $P_o$ is a signal whose frequency is modulated by the vortexes. Pulse signal $P_o$ is demodulated by demodulator 7 and is applied to counter 8. The flow rate is obtained from the count obtained by counter 8.

However, although the vortex flowmeter described above is possible to achieve in theory, the following problem arises when attempting to realize the flowmeter in practice. The problem will be explained with reference to FIG. 4.

In FIG. 4, vortex generator 1 is disposed in the diametric direction of pipe 3, which is made of stainless steel, for example, and the transmitter 4 and receiver 5 are disposed on the outer wall of pipe 3 on the downstream side of the vortex generator 1 and facing each other. The transmitter 4 and receiver 5 are disposed so that they do not contact the fluid being measured.

Transmitter 4 transmits an ultrasonic signal B, shown by the dotted line, which is received by receiver 5, and which passes through the inside of pipe 3. Also, an ultrasonic signal C, which is a standing wave and is shown by the fine (see lower part) line, is received by receiver 5 after being repetitively reflected by the inner wall of pipe 3. In addition, an ultrasonic signal A, shown by the heavy line, is received by receiver 5 after passing through the propagation path crossing a vortex.

Ultrasonic signals B and C are noise signals which are detected by receiver 5 together with the ultrasonic signal A since these signals are transmitted by transmitter 4 as a continuous wave. Thus, in the case of FIG. 3, the vortexes cannot be detected with stability and without being adversely affected by noise.

The conventional vortex type flowmeter, as just described, cannot be realized in practice because of the noise propagated within the pipe and the noise resulting from the standing wave in the pipe. Also, in the flow meter of the type that detects changes of pressure on either side of a jetted fluid utilizing a piezoelectric sensor, such flowmeter cannot be used where the fluid is corrosive or is contaminated.

SUMMARY OF THE INVENTION

Accordingly, an object of the invention is to overcome the aforementioned and other problems and deficiencies of the prior art.

A further object is to provide a fluid vibrating flowmeter which is not substantially influenced by noise propagating within a measuring pipe or by noise caused by standing waves formed in the pipe.

Another object is to provide a flowmeter which is resistant to corrosive or contaminated fluids to be measured.

The foregoing and other objects are attained by the invention which encompasses an ultrasonic fluid vibrating flowmeter for measuring the flow rate of a fluid to be measured, by irradiating ultrasonic signals or waves to the fluid to cause vibration of the fluid and then detecting the fluid vibrations, wherein the flowmeter comprises an ultrasonic transmitter and an ultrasonic receiver mounted on a measuring pipe through which the fluid flows and disposed so that the transmitter and receiver do not contact the fluid and for transmitting and receiving ultrasonic signals;

driving means for intermittently driving the transmitter using burst waves containing an oscillation frequency;

standard timing means for generating a standard signal to control the timing of the burst waves;

sampling signal generating means for generating a sampling signal synchronized with the standard signal and whose sampling time is changed by a function of the diameter of the pipe and the sound velocity of the fluid;

sampling means for sampling an amplitude modulated signal whose amplitude is modulated due to the frequency modulation caused by the fluid vibration in the receiver by means of the sampling signal; and filtering means for determining an envelope of the amplitude modulated signal sampled by the sampling means to detect a vibration frequency of the fluid vibration from the envelope.

BRIEF DESCRIPTION OF THE DRAWINGS

FIGS. 13A and 13B are longitudinal section views depicting other illustrative receivers.

FIG. 14 is a transverse section view depicting an improved structure which eliminates adverse influences of curvature of the receiving and transmitting surfaces of the embodiment of FIG. 5.

FIG. 15 is a transverse section view useful for explaining the influence of curvature when the measuring pipe line diameter is large.

FIG. 19 is an explanatory view useful for explaining the propagation of ultrasonic signals within the pipe having a curvature.

FIG. 20 is a transverse section view depicting an improvement which reduces propagating waves in the pipe line.

FIGS. 21A and 21B are transverse section views depicting other improvements which reduce the propagating waves in the pipe line.

DETAILED DESCRIPTION OF PREFERRED EMBODIMENTS

Figure 1:
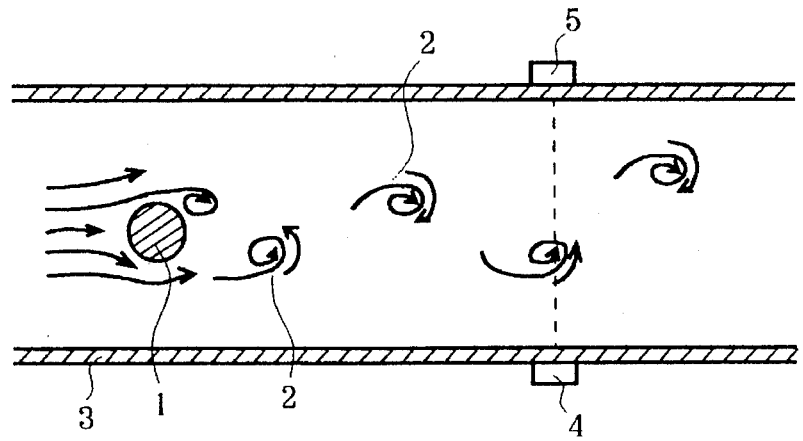
FIG. 1 is a longitudinal section view depicting a conventional vortex flowmeter.
Figure 2:
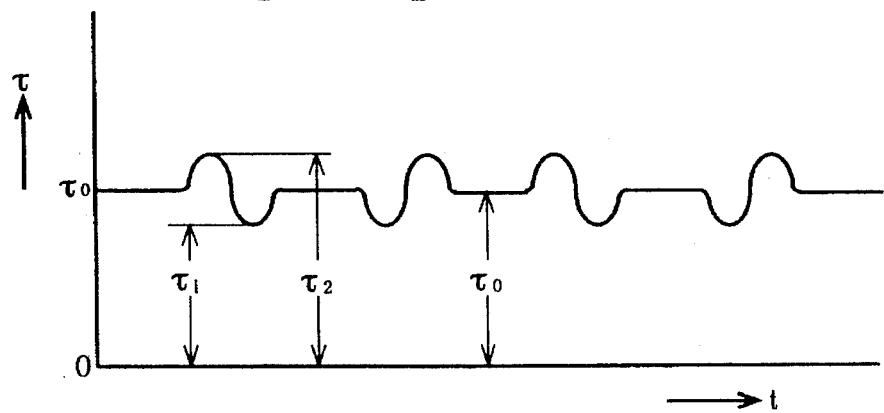
FIG. 2 is a waveform chart useful in explaining the operation of the flowmeter of FIG. 1.
Figure 3:
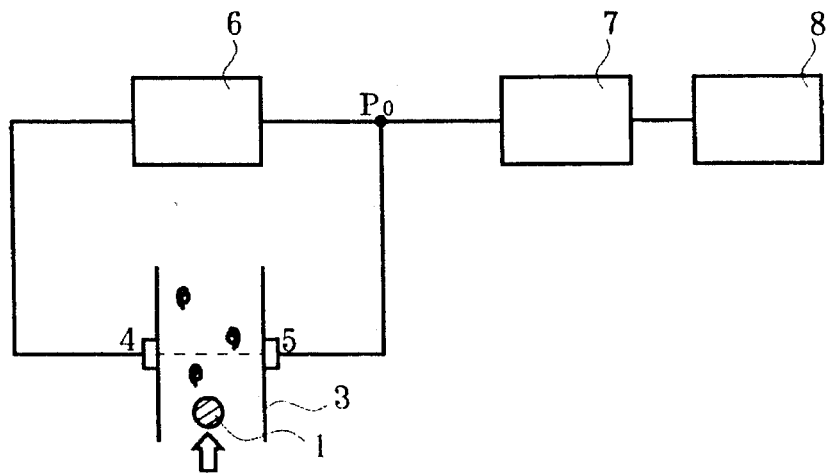
FIG. 3 is a block diagram of a processing system, including the flowmeter shown in FIG. 1.
Figure 4:
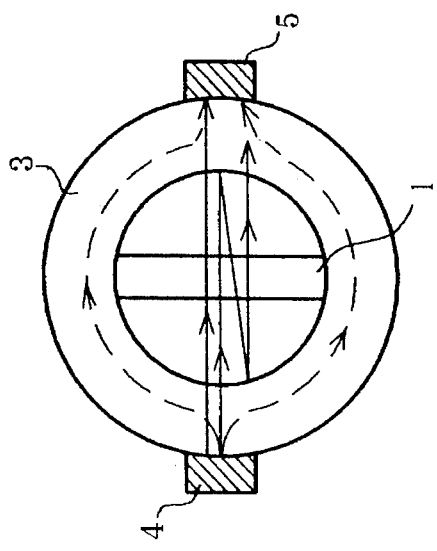
FIG. 4 is a transverse section view useful for explaining a problem faced by the flowmeter of FIG. 1.
Figure 5:
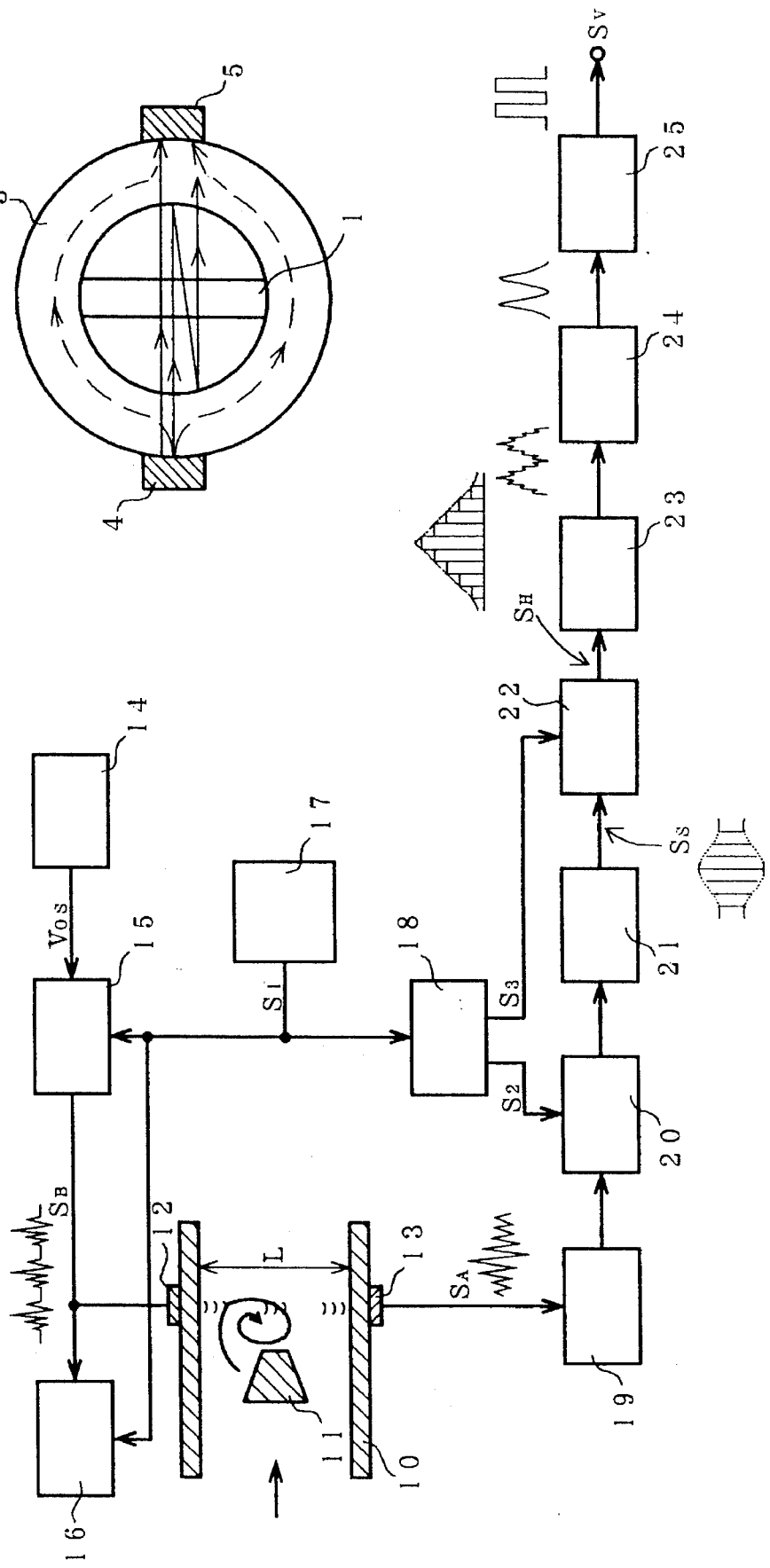
FIG. 5 is a block diagram depicting an illustrative embodiment of the invention.
Figure 6:
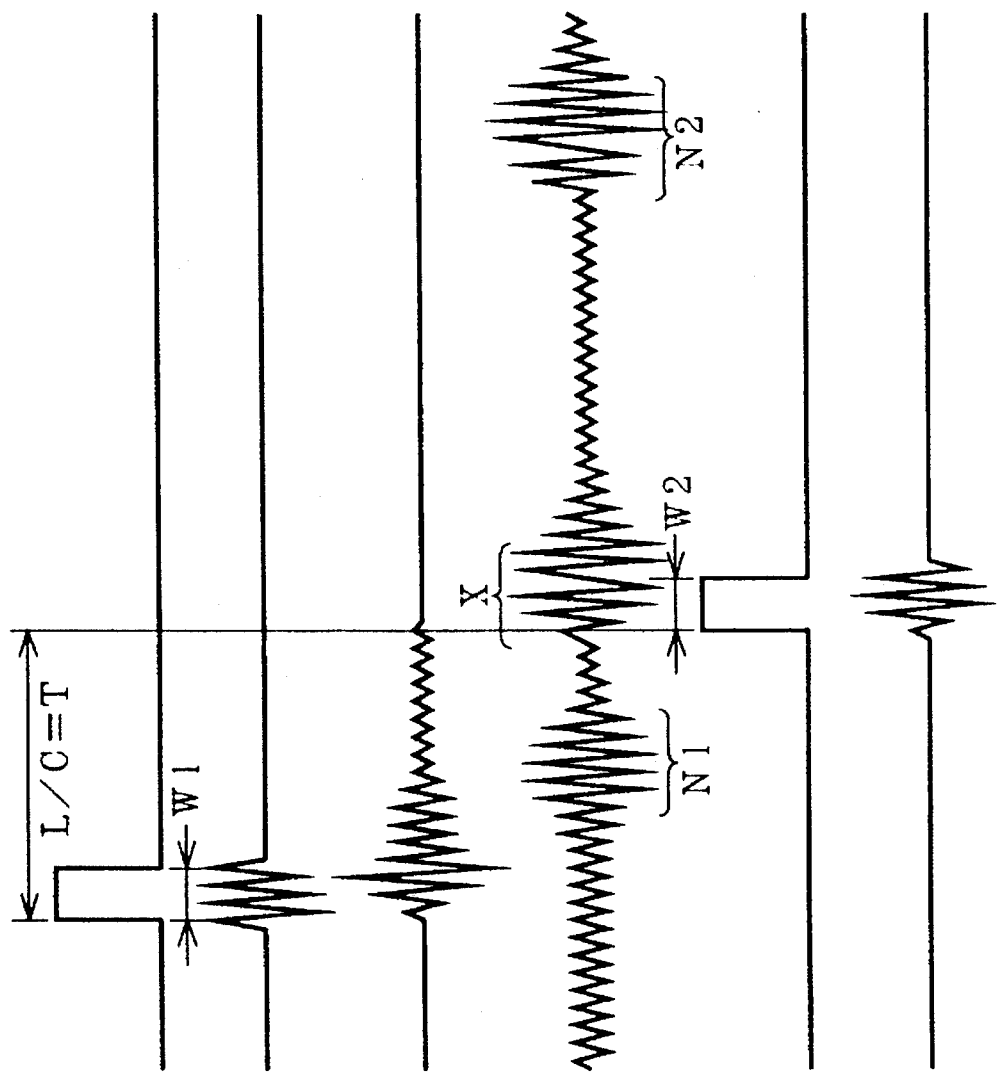
FIGS. 6A–6G are waveform charts useful for explaining the operation of the embodiment of FIG. 5.
Figure 7:
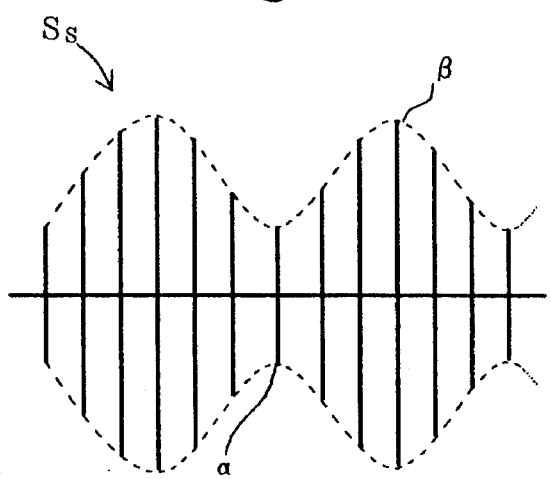
FIG. 7 is another waveform chart useful for explaining the operation of the embodiment of FIG. 5.

FIG. 5 shows an illustrative embodiment of the invention, comprising a measuring pipe line 10 (hereinafter called "pipe"), made, for example, of stainless steel, and within which flows a fluid to be measured for flow rate; a vortex generator 11 fixed in the diametric direction of pipe 10 and having a trapezoidal cross-section; an ultrasonic transmitter 12 fixed on the outer wall of pipe 10 and on the downstream side of vortex generator 11 and disposed so as to not be in contact with the fluid to be measured; and an ultrasonic receiver 13 disposed facing the transmitter 12.

An oscillator 14 supplies to switch 15 an oscillating voltage $V_{os}$, which continuously oscillates, for example, at an oscillation frequency of about 1 to 2 MHz. The ON/OFF state of switch 15 is controlled by a standard signal $S_1$ having a gate width $W_1$. From switch 15, the oscillating voltage $V_{os}$ is supplied to transmitter 12 as a burst wave $S_B$ which corresponds to gate width $W_1$.

A damping circuit 16 is turned ON/OFF by standard signal $S_1$, and by using a resistance, terminates and quickly attenuates to zero level, the vibrating voltage $V_R$ accompanying the slowly fluctuating residual vibration generated in transmitter 12.

A standard timing circuit 17 generates standard signal $S_1$ which acts as a time standard for sampling signals. Switch 15 is turned ON when standard signal $S_1$ is at a high level, and the resistance in damping circuit 16 is turned ON when standard signal $S_1$ is at a low level. At the same time, standard timing circuit 17 outputs standard signal $S_1$ also to a sampling signal generating circuit 18.

The sampling signal generating circuit 18 receives standard signal $S_1$ and in response thereto, outputs sampling signal $S_2$ and reset signal $S_3$ which are standard signal $S_1$ delayed by a time T. Delay time T is determined by a function ($L/C_A$) of the inner diameter L of pipe 10 and the sound velocity $C_A$ of the fluid being measured. Sampling signal $S_2$ has a predetermined gate width $W_2$ which corresponds to gate width $W_1$. Reset signal $S_3$ is outputted as a signal which in a very short time resets to gate width $W_2$.

An amplitude modulated signal $S_A$, received by receiver 13, is amplified by a preamplifier 19 and is outputted to a sampling circuit 20. Sampling circuit 20 samples only the amplitude modulated signal $S_A$ which falls into the time of gate width $W_2$ of sampling signal $S_2$ and outputs the sampled signals to a tuned amplifier 21.

Tuned amplifier 21 selects and amplifies the sampled amplitude modulated signal $S_A$ and outputs the amplified signal as a tuned signal $S_s$ to a peak detecting and half-wave rectifier circuit 22 in the next stage. The Q-value of tuned amplifier 21 is set to be lower than normal Q-values, i.e. around Q =10 to 20, for example, to cause damping.

When waves are successively outputted exceeding the predetermined number of waves of the oscillation frequency $f_{os}$ contained in the time frame of gate width $W_1$, even if no burs wave is outputted, the next signal processing may be adversely influenced if the Q-value is large.

Reset signal $S_3$ is applied to peak detecting and half-wave rectifier circuit 22 and a histogram which corresponds to an envelope of tuned signal $S_s$ is created by repetitively holding the peak values of tuned signal $S_s$ and resetting for a short period of time just before the holding. After that, the signal is half-wave rectified to be outputted as a half-wave rectified voltage $S_H$.

Half-wave rectified voltage $S_H$ is outputted to a low pass filter 23, having a high cut-off frequency, to remove noise and other undesired influences produced in the peak detecting and half-wave rectifier circuit 22, and the filtered signal is then outputted to an active low-pass filter 24.

Active low-pass filter 24 is set at a low cut-off frequency and removes noises contained in the vortex signal or low frequency noises, such as fluid noise, and the filtered signal is outputted to a Schmitt trigger circuit 25. The Schmitt trigger circuit 25 converts the vortex signal, contained in the output of the active low pass filter 24, to a pulse signal $S_v$.

Figure 25:
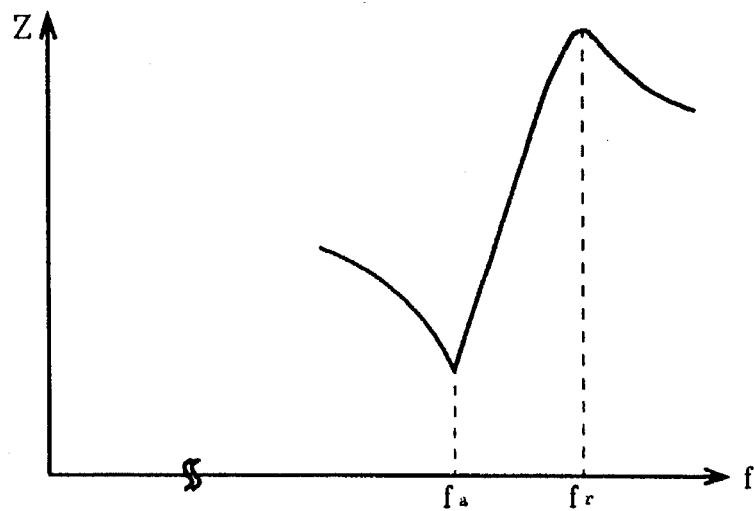
FIGS. 25A and 25B are graphs depicting frequency location and useful for explaining frequency and impedance characteristics near the resonant frequencies of the receiver and transmitter.
Figure 25:
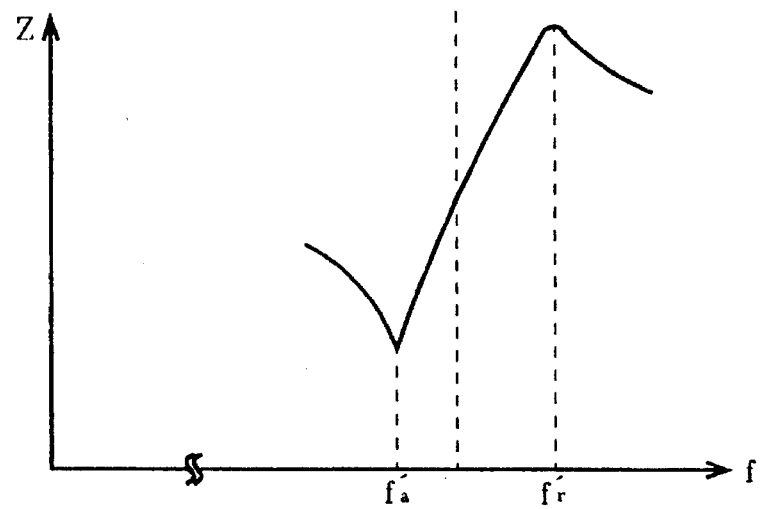

The operation of the embodiment of FIG. 25 will now be described with reference to FIGS. 6A–6G and 7. Oscillating voltage $V_{os}$ (see FIG. 6A) outputted from oscillator 14 is turned ON when standard signal $S_1$ (see FIG. 6B) is at a high level and is turned OFF when the standard signal $S_1$ is at a low level. The burst wave $S_B$ (see FIG. 6C) is thus outputted to transmitter 12.

Because a residual vibration exists in the vibrator comprising transmitter 12, the vibrating voltage $V_R$ (see FIG. 6D) which fluctuates slightly is brought about even if burst wave $S_B$, which exhibits a sharp change, is applied to transmitter 12.

If the period of vibrating voltage $V_R$ is prolonged, the period lasts to a point in time when the next burst wave $S_B$ is transmitted. In order to avoid this from happening, transmitter 12 is terminated by a resistance in damping circuit 16 when the standard signal $S_1$ (see FIG. 6B) is at a low level, to thereby quickly converge the residual vibration.

When burst wave $S_B$ is applied to transmitter 12, ultrasonic signals are sent out from the transmitter 12 to the vortexes. The ultrasonic signal is frequency modulated by the vortex and is received by receiver 13 as an amplitude modulated signal $S_A$ (see FIG. 6E).

In the amplitude modulated signal $S_A$, the noises (See FIG. 6E) caused by the pipe line propagating wave $N_1$, propagating through pipe 10, and by the standing wave $N_2$ formed by waves propagating between the inner walls of pipe 10, as explained with reference to FIGS. 1–4, are mixed via the vortex signal component X which has been frequency modulated by the vortex.

Amplitude modulated signal $S_A$ is amplified a predetermined number of times by preamplifier 19 and the amplified signal is outputted to sampling circuit 20. Sampling signal $S_2$ (see FIG. 6F) is applied to sampling circuit 20 from sampling signal generating circuit 18 and amplitude modulated signal $S_A$ is sampled by sampling signal $S_2$.

The vortex signal component X (see FIG. 6E) exists at a point in time after time T has elapsed from the time when standard signal $S_1$ was transmitted (see FIG. 6B) and signal X is sampled by sampling signal $S_2$ at this time. The sampled amplitude modulated signal $S_A$ containing the vortex signal component X, is amplified by tuned amplifier 21 and the amplified signal is outputted at its output terminal as tuned signal $S_s$ (see FIG. 6G).

Because standard signal $S_1$ (see FIG. 6B) is sequentially transmitted at predetermined time intervals, a waveform of the tuned signal (see FIG. 7) is formed when they are arranged in a time series manner. A portion which corresponds to the vortex signal component X, for example, is contained in this waveform. In this case, a part alpha ($\alpha$) indicates the case when the direction of the ultrasonic signal and that of the Karman vortex are opposite. A part beta ($\beta$) indicates the case when the direction of the ultrasonic signal and that of the Karman vortex are the same. That is, it shows that the peak values and vortexes correspond in a one-to-one relation.

Tuned signal $S_s$, thus obtained, is outputted to peak detecting and half-wave rectifying circuit 22. Reset signal $S_3$ is applied to peak detecting and half-wave rectifying circuit 22 to create the histogram of the tuned signal $S_s$. Circuit 22 half-wave rectifies the tuned signal $S_s$ and outputs the half-wave rectified voltage $S_H$ at its output terminal.

The noise in the half-wave rectified voltage $S_H$ is removed by low-pass filter 23 and active low-pass filter 24, and the half-wave rectified voltage $S_H$ is outputted at the output terminal of Schmitt trigger circuit 25 as pulse signal $S_v$ which corresponds to the number of vortexes.

Next, the conditions which enable receiver 13 of FIG. 5 to largely and stably receive the amplitude modulated signal $S_A$ will be explained. The propagation time $\tau_o$, when there is no vortex, is given by the above expression (1). The propagation time $\tau_3$, when there is a vortex, is given as follows, taking into account above expressions (2) and (3).

$$\tau_3 = [d_v/(C_A = V_A \sin \omega_v t)] + [(D-d_v)/C_A] \quad (4)$$

wherein $V_A \sin \omega_v t$ is the fluid vibrations of the vortex and $V_A$ is the velocity of a circulating flow of the vortex.

Thus, the phase change of the ultrasonic signal caused when the vortex passes is given as follows.

$$d\Phi = (\tau_o - \tau_3)\omega_{os} \quad (5)$$

wherein $\omega_{os}$ ($=2\pi f_{os}$) is the oscillation angular frequency of oscillating voltage $V_{os}$ of oscillator 14.

If the maximum phase shift is assumed to be $\Delta\Phi$ here, the following expression is given from the relation $C_A^2 \gg V_A^2$.

$$\Delta\Phi = \pm V_A d_v \omega_{os}/C_A^2 \quad (6)$$

If the maximum frequency shift at this time is assumed to be $\Delta f_{MAX}$, $\Delta f_{MAX}$ may be obtained as $$\Delta f_{MAX} = (\Delta\Phi)' = 2V_A d_v \omega_{os}/C_A^2 \quad (7)$$

Figure 8:
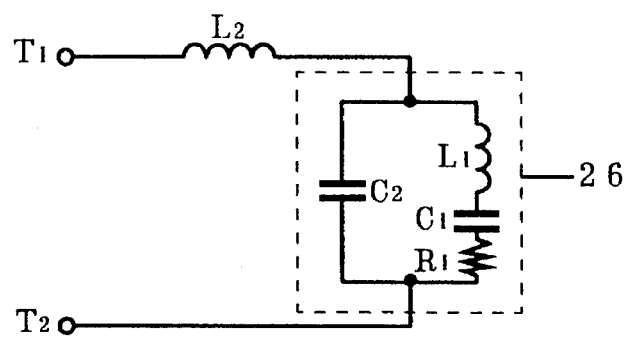
FIG. 8 is an equivalent circuit diagram depicting the ultrasonic transmitter and ultrasonic receiver of FIG. 5.
Figure 9:
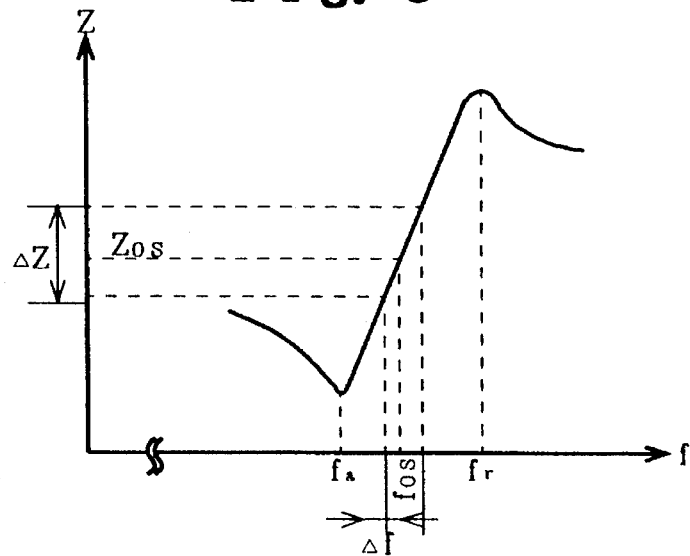
FIG. 9 is a characteristic graph depicting the impedance characteristics of the transmitter and receiver of FIG. 5.

On the other hand, while ultrasonic receiver 13 comprises a piezoelectric vibrator, as shown in FIG. 8, an equivalent circuit 26 near the resonant frequency $f_a$ and antiresonant frequency $f_r$ of the vibrator may comprise a capacitor $C_2$ which is connected in parallel to a series connected inductance $L_1$, capacitor $C_1$ and resistance $R_1$. An inductance $L_2$ for widening the frequency band is connected in series to the parallel circuit 26, and the entire circuit is connected to terminals $T_1$ and $T_2$. An impedance Z, as seen from the terminals $T_1$ and $T_2$, becomes minimum at resonant frequency $f_a$ and maximum at antiresonant frequency $f_r$, as shown in FIG. 9.

In these frequency areas, the changes of impedance Z are greater than those in other frequency areas. Accordingly, a large impedance change $\Delta Z$ may be obtained by setting the value of the oscillating frequency $f_{os}$ in between the resonant frequency $f_a$ and the anti-resonant frequency $f_r$.

As a result, the amplitude modulated signal, having a large amplitude modulated by the vortex, may be obtained at the output terminal of receiver 13. The same also applies to the amplitude modulated signal $S_A$ shown in FIG. 6E which is obtained when it is a burst wave.

While FIG. 8 shows an inductance $L_2$ connected in series to the vibrator of receiver 13, this structure involves the case when the band is widened to lower the resonant frequency $f_a$. Such a structure enables the operational range of the oscillation frequency $f_{os}$ ($f_a$ to $f_r$) to accommodate changes of frequencies $f_a$ and $f_r$, which are caused by changes of temperature.

Furthermore, if oscillation frequency $f_{os}$ is selected as a resonant frequency of transmitter 12, the ultrasonic signals from oscillator 14 are applied to the fluid to be measured with maximum efficiency. It is useful in maintaining stable operation to select the value of the oscillation frequency for each of the transmitter and receiver by taking into account the resonant frequency thereof.

Next, the means for improving the detecting sensitivity of the FIG. 5 embodiment, will be explained with reference to FIG. 10, wherein the transmitter 12 and receiver 13 are mounted on pipe 10. The part of the pipe wall on which is mounted the transmitter 12 and receiver 13 is selected to have the dimension $M \approx \lambda/2$ wherein $\lambda$ is the wavelength of the ultrasonic signal within the pipe 10 so that the ultrasonic signals are transmitted at a maximum at this time.

Figure 10:
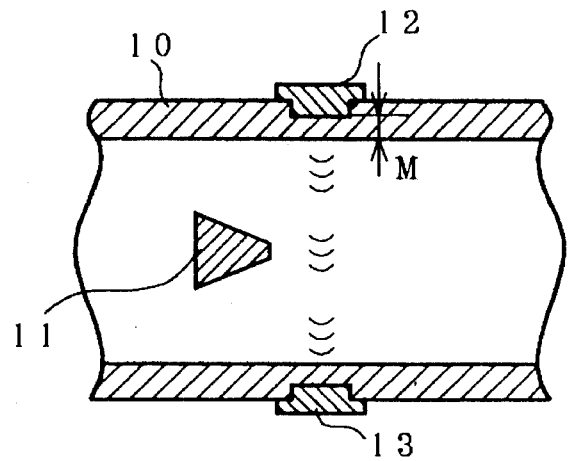
FIG. 10 is a partial longitudinal section view depicting an improvement in the mounting of the transmitter and receiver in the embodiment of FIG. 5.
Figure 11:
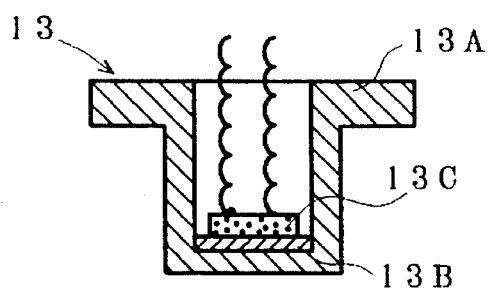
FIG. 11 is a longitudinal section view depicting the inside structural features of the receiver of FIG. 10.

FIG. 11 shows the inside structure of transmitter 12 and receiver 13 of FIG. 10. In FIG. 11, the receiver 13 is used as an example. Case 13A, of receiver 13, is formed as a cylindrical shape with a flange and is made of stainless steel, for example. A piezoelectric vibrator 13C is bonded to the bottom part of case 13A through a disc shaped silicon rubber part 13B. By bonding vibrator 13C elastically using the silicon rubber, or the like, shown as part 13B, both ends of the piezoelectric vibrator 13 have similar impedance characteristics with respect to that of a free standing simple substance and the vibrator exhibits a sharp impedance change as described with reference to FIG. 9.

Figure 12:
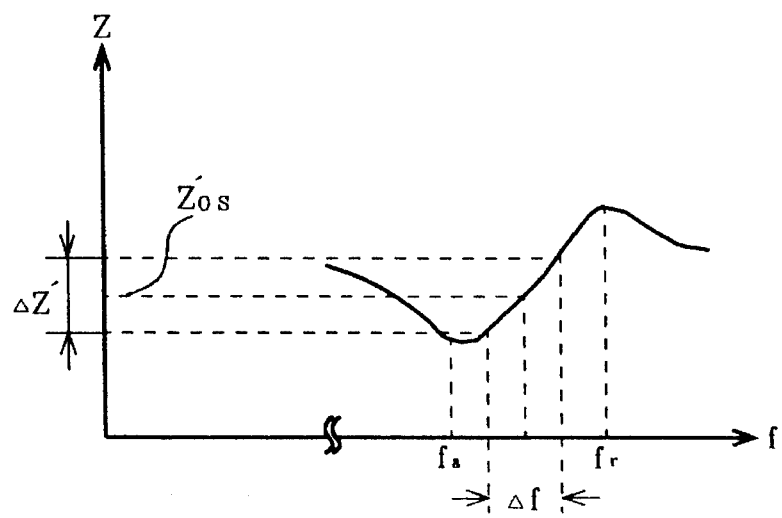
FIG. 12 is a graph useful for explaining changes of impedance characteristics accompanying the fixation of the piezoelectric vibrator.

On the other hand, if piezoelectric vibrator 13C is adhered to case 13A using an epoxy resin, for example, the results would be similar to that obtained by coupling with a load, and the impedance characteristic thereof would show a flat characteristic as a whole as shown in FIG. 12. As a result, an impedance change due to the frequency shift of the ultrasonic signal caused by the vortex becomes small, leading to the degradation of the detecting sensitivity. This happens because resistance $R_1$ representing a loss in FIG. 10, increases depending mainly on the state of the acoustic load.

FIGS. 13A and 13B show other alternative constructions of the receiver of FIG. 11, wherein FIG. 13A shows the entire piezoelectric vibrator 26B covered with an elastic body 26C; and FIG. 13B shows part of the vibrator 27B being fixed. FIG. 13A shows receiver 26 comprising a piezoelectric vibrator 26B disposed in a cylindrical case 26A made of stainless steel and covered entirely with silicon rubber part 26C, to reduce the acoustic load. In FIG. 13B, the ultrasonic receiver 27 comprises a cylindrical depressed section 27B disposed at the bottom of cylindrical case 27A which case is made of stainless steel, and which stores a silicon rubber part therein., a disc shaped piezoelectric vibrator 27C disposed at the top of the silicon rubber filling, and a ring 27D for fixing the periphery of vibrator 27C. In this manner, the construction of FIG. 13B reduces the acoustic load.

Although the vibrator is attached by using silicon rubber as the elastic body, the embodiments of FIGS. 13A and 13B are not limited to use of such silicon rubber. Other elastic material may be used to reduce the acoustic load.

Next, the adverse influence of curvature of the pipe on the flow rate measurement in the FIG. 5 embodiment will be explained with reference to FIG. 14, wherein a pipe 28 is constructed so that the fixing surfaces 28A and 28B located on the outer surface of the pipe 28 and on which transmitter 29 and receiver 28, respectively are fixed, and transmitting and receiving surfaces 28C and 28D located on the inner wall of pipe 28 are located parallel to each other.

The transmission and receiving efficiency may be improved by forming the pipe 28 so that the described part and surfaces are substantially parallel, as depicted. If each interval W between surfaces 28A and 28C, and 28B and 28D, is selected to be $W = n(\lambda/2)$, wherein n is a positive integer, and $\lambda$ is the wavelength, in case of a continuous wave, for example, it may be transmitted without reflection. This selection is effective also when using the burst wave, as done in the illustrative embodiment.

When the measuring pipe line has a small bore diameter, because the curvature of the pipe is large, as shown in FIG. 15, and the difference of intervals W ($\Delta W/W$) is relatively large at the center and the edge portions of the transmitting surface, the ultrasonic signal transmitted to the fluid becomes small.

On the other hand, it is possible that the ultrasonic signal may be totally reflected at the edge portion when receiving the signal, if the incident angle $\theta_{L1}$ is too large. This problem is explained with reference to FIG. 16, which shows the relationship between the incident angle of the ultrasonic signal and the energy distribution ratio when the ultrasonic signal is applied to the fluid, when it is water, and is received on the side of the pipe 31, which is made of steel.

Figure 16:
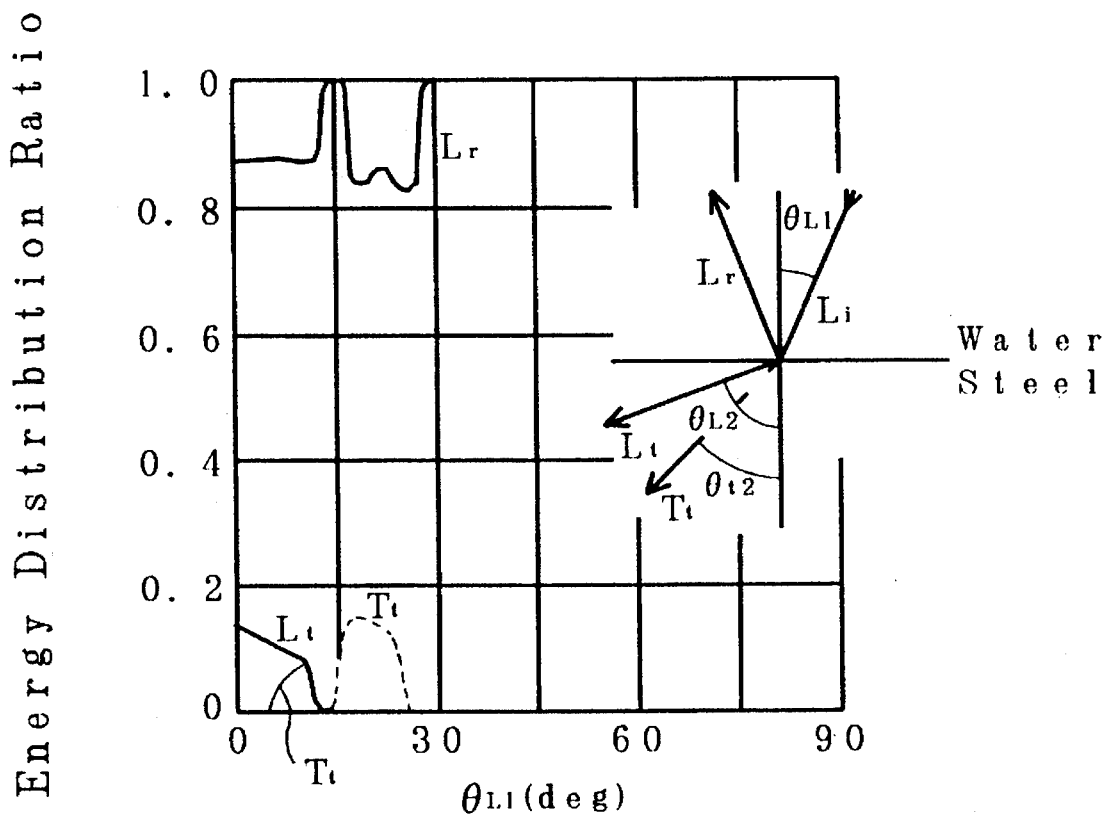
FIG. 16 is a graph useful for explaining the relationship between an incident angle to the pipe and energy distribution rate.

As shown in FIG. 16, most of the ultrasonic signal inputted as a longitudinal wave at incident angle $\theta_{L1}$ is reflected at the boundary surface as a reflected wave $L_r$, and a longitudinal wave component $L_t$ having the angle of refraction of $\theta_{L2}$ and transverse wave $T_t$ having the angle of refraction of $\theta_{t2}$, are both generated as transmitted waves. Among the waves, only the longitudinal wave component $L_t$, whose incident angle is up to about 15° can be used, and no energy distributed above that angle.

Accordingly, the locations of the piezoelectric vibrators, comprising the transmitter and receiver, would be most effective, to have the long fixing surfaces in the axial direction of the pipe, especially when the pipe has a small bore diameter.

Figure 17:
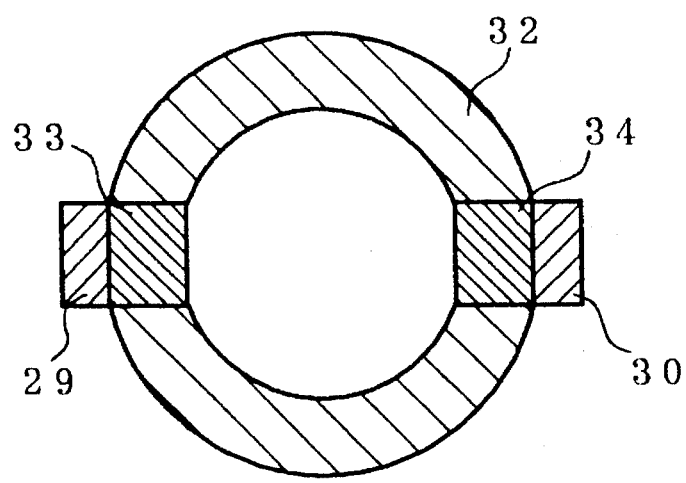
FIG. 17 is a transverse section view depicting another improvement which eliminates adverse influence of curvature of the transmitting and receive surfaces of the embodiment of FIG. 5

It is also possible to efficiently transmit and receive the ultrasonic signal by providing a pair of through holes in the wall of pipe 32 with adapters 33,34 therein, and by fixing the receiver 29 and receiver 30, on the adapters 33,34, which have flat transmitting and receiving surfaces, as shown in FIG. 17.

Means for reducing the influence of noise in the FIG. 5 embodiment will now be discussed. As described in FIG. 4, when the receiver and transmitter are mounted on the pipe by clamping, noise, which propagates through the pipe and reaches the receiver, exists together with the ultrasonic signal being applied to the fluid during the measuring process. Such noise and signal may be separated by utilizing the time difference caused by the differences in propagation distance and sound velocity, such as shown in FIGS. 6A–6G.

In the waveform charts of FIGS. 6A–6G, while the pipeline propagating wave $N_1$ approaches the vortex signal component X, the degree of the approach depends on the size (mainly the thickness and curvature of the inner surface, etc) of the pipe which differs, depending on the bore diameter, pressure standard, etc. The sampling period has to be shortened especially when the pipe has a small bore diameter and a high vortex frequency.

If the sampling period, i.e. the period of the burst wave, is shortened, the vortex signal may be reproduced favorably when reproducing same from the amplitude modulated wave of the envelope shown in FIG. 5.

Figure 18A:
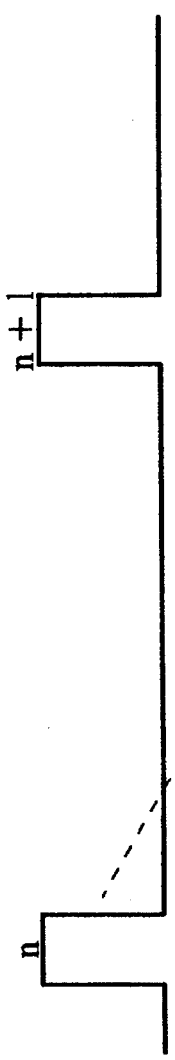
FIG. 18A–18C are waveform charts useful for explaining the separating of noises by use of time difference.
Figure 18B:
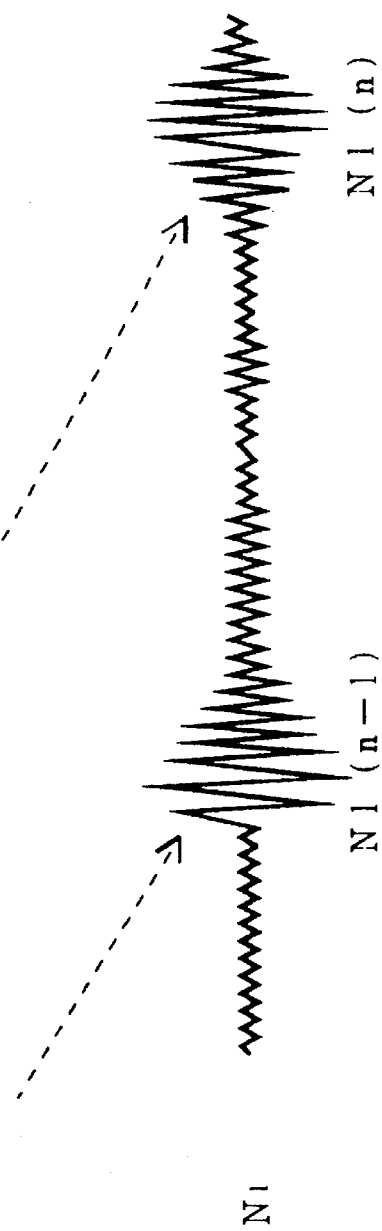
Figure 18C:
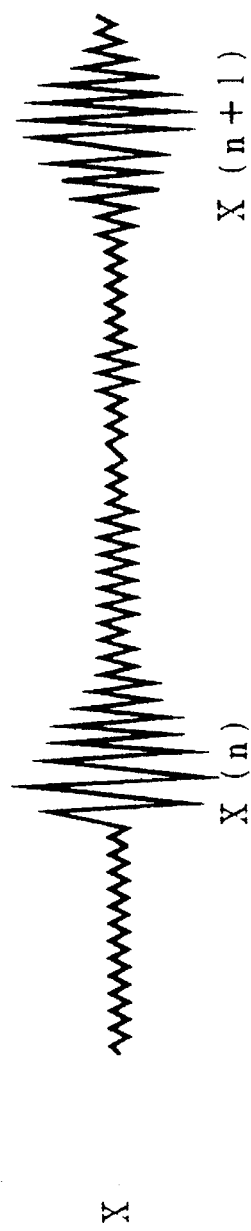

However, there arises an overlap or approach between the preceding pipe line propagating wave $N_1$ (n−1) (see FIG. 18B), and the next vortex signal component X (n) (see FIG. 18C) for the (n−1)th, n-th, and the (n+1)th standard signals $S_1$ (see FIG. 18A) transmitted, as shown in FIG. 19. It is difficult to separate the noise from the measuring ultrasonic signal by a process which uses only the time difference.

Furthermore, the propagating wave $N_1$ travels in the pipe and has a directionality. When the fluid to be measured is water, about 93% of the wave is reflected by the boundary surface of the pipe and the reflected wave is combined with the next ultrasonic signal. Then the propagating wave travels again within the pipe and is again reflected. This is repeated a number of times during that period of time in which the burst wave exists.

This phenomenon is brought about when a plane wave ultrasonic signal is inputted to the boundary surface. If the boundary surface has a curvature, the ultrasonic signal transmitted from the ultrasonic transmitter 35 spreads while being reflected between the inner and outer walls, as shown in FIG. 19.

Furthermore, besides the irradiated longitudinal wave, a transverse wave is generated within the pipe 35. Because the longitudinal wave has a sound velocity of about 5900 m/s, and the transverse wave has a sound velocity of about 3230 m/s, it is difficult to accurately predict the time when the propagating wave $N_1$ will arrive at the receiver. Also, the sound velocity of the ultrasonic signal transmitted into the fluid differs largely dependent on the type of fluid, temperature, etc.

If the influence of the propagating wave $N_1$ can be reduced, the gate width of sampling signal $S_2$ (see FIG. 6F) may be widened. As a result, adjustments required due to the fluid conditions become unnecessary and the sampling may be stabilized even if the sound velocity changes.

FIGS. 20 and 21A–21B, are transverse section views showing pipe structures which reduce the propagating wave $N_1$ in the pipe. In FIG. 20, deep grooves 37A–37D are provided on both sides of transmitter 38 and receiver 39 along the longitudinal axis direction of the pipe. The deep grooves 37A–37D provide reflecting surfaces so that most of the propagating wave $N_1$ is reflected thereby and the level of noise traveling from transmitted 38 to receiver 39 after passing through the pipe 37, is reduced considerably.

While in FIG. 20, the reflecting surfaces are formed by four deep grooves 37A–37D, the same effect can be obtained when the number of grooves is increased and the grooves are made shallower. It is also possible to provide a plurality of concave and convex portions on the surface of pipe 37, that is so that the reflecting surfaces are formed by means other than the grooves.

In FIG. 21A, pipe 40 is provided with L-shaped notches 40A–40D which form reflecting surfaces at the four corners of the pipe 40. In FIG. 21B, pipe 41 is provided with extended parts 41A and 41B, respectively, at the upper and lower surfaces of pipe 41.

Next, the influence of bubbles in the FIG. 5 embodiment will be discussed. In FIG. 5, the ultrasonic signal may be attenuated and the sensitivity of the device reduced by the presence of bubbles in the fluid to be measured, and the size of the bubbles. When the fluid is a liquid, the ultrasonic signal is scattered and absorbed if the particles or bubbles exist in the fluid and have an acoustic impedance different from that of the fluid. This is especially the case when the bubbles are caused to be in a resonant state. Then, a striking amount of attenuation results and it becomes difficult to receive the ultrasonic signals.

The resonant frequency $f_r$ of the bubble differs depending on the diameter thereof (a = radius in cm) and it is assumed to be $f_r=326/a$ (Hz) under normal temperature and pressure. Accordingly, it is necessary to select the frequency $f_{os}$ of the ultrasonic signal to be used which will not resonant the bubble.

When a titanate-lead zierconate ceramic (PZT) is used for the piezoelectric vibrator, there are vibrational modes in the thickness direction and in the thickness shearing direction, wherein the longitudinal wave is efficiently applied to the fluid and their frequency ratio is about 2 to 1. Thus, if the thickness direction is 1 MHz, the thickness shearing direction is 500 kHz.

FIT. 22 shows frequency vs. impedance characteristics taking into account the frequencies in the thickness shearing direction and the thickness direction. Portions which exhibit a sharp impedance change exists near the resonant frequency $f_1$ in the thickness shearing direction and the resonant frequency $f_2$ in the thickness direction.

Figure 22:
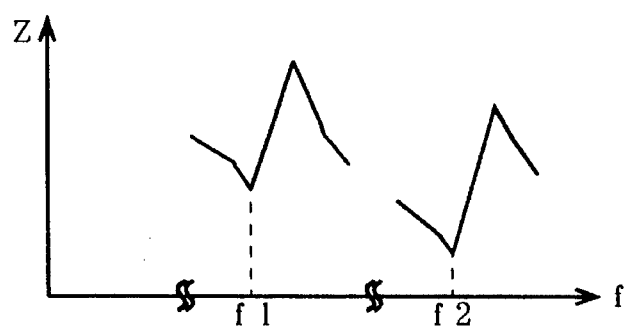
FIG. 22 is a graph depicting frequency plotted against impedance characteristics in which frequencies in the thickness shear direction and the thickness direction, are taken into account.

While the changes of impedance characteristics of the piezoelectric vibrator used in receiver 13 is utilized in the embodiment of FIG. 5, there is a portion which exhibits sharp impedance change near the thickness shearing resonant frequency $f_1$, as shown in FIG. 22, and there is no problem with the signal processing even if this portion is used.

Figure 23:
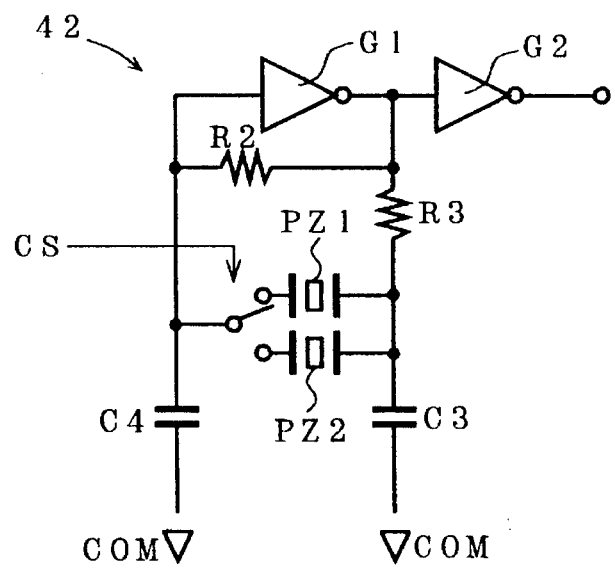
FIG. 23 is a circuit diagram depicting an oscillator having a part thereof improved over the oscillator of FIG. 5.

Instead of oscillator 14 of FIG. 5, the oscillator 42, shown in FIG. 23, may be used. Oscillator 42 comprises inverters $G_1$ and $G_2$ connected in series, resistance $R_2$ connected between the input and output terminals of inverter $G_1$. The output terminal of inverter $G_1$ is connected to a common potential point COM via a resistance $R_3$ connected in series to capacitor $C_3$. The input terminal of inverter $G_1$ is connected to common potential COM via a capacitor $C_4$. A piezoelectric vibrator PZ1 for vibrating in the thickness direction and a piezoelectric vibrator PZ2 for vibrating in the thickness shearing direction are connected via a switch, which is changed over by a change over signal CS, between the capacitors $C_3$ and $C_4$. The influence of the bubbles may be eliminated by switching vibrators PZ1 and PZ2 by use of change over signal CS.

In this case, the tuned frequency of the tuned amplifier 21 in FIG. 5 may be arranged so as to be changed over corresponding to the change over signal CS or to have flat frequency characteristics.

Figure 24:
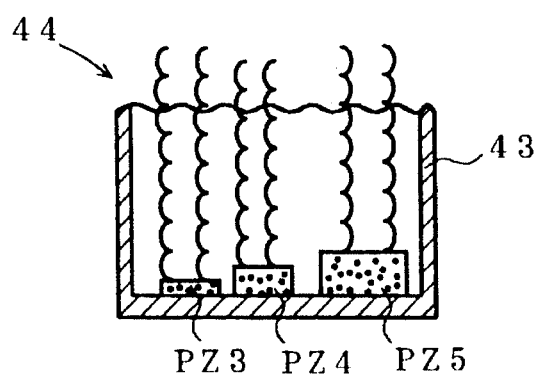
FIG. 24 is a circuit diagram depicting another oscillator having a part thereof improved over the oscillator of FIG. 5.

While the arrangement for reducing the influence of bubbles by switching the vibration modes of the piezoelectric vibratorrs has been explained with reference to FIG. 23, the same effect may be obtained by using a plurality of sets of piezoelectric vibrators PZ3, PZ4 and PZ5,etc, as shown in FIG. 24, having different vibration frequencies, i.e. different thicknesses, to form the transmitter 44, and by switching between them depending on the diameters of the bubbles.

Next, means for generally improving the transmitting and receiving efficiencies of the FIG. 5 embodiment will now be explained. Because the embodiment is constructed so as to convert the frequency modulation caused by the vortex into amplitude modulation by utilizing the sharp section of the impedance characteristics of the piezoelectric vibrators used in the transmitter and receiver, the efficiencies thereof are reduced when the same piezoelectric vibrator is used therein.

An arrangement for improving the general efficiency of the flowmeter will be discussed with reference to FIGS. 25A and 25B, wherein FIG. 25A shows the frequency vs. impedance characteristics of the transmitter and FIG. 25B shows the frequency vs. impedance characteristics of the receiver.

In FIG. 8, an equivalent circuit 26 is show for frequencies near the resonant point of the vibrator used in the receiver. The resonant frequency $f_a$ and the antiresonant frequency $f_r$ on the transmission side as shown in FIG. 25A at this time are as follows:

$$f_a = \tfrac{1}{2}\pi (L_1 * C_1)^{1/2}$$

$$f_r = \tfrac{1}{2}\pi [L_1 * C_1 * C_2/(C_1 + C_2)]^{1/2}$$

Similarly, the resonant frequency $f_a'$ and antiresonant frequency $f_r'$ on the receiving side are shown in FIG. 25B.

At this time, in order to cause the ultrasonic transmitter to apply a large ultrasonic signal, the driving oscillation frequency $f_{os}$ outputted from oscillator 14, is selected to be equal to the resonant frequency of the piezoelectric vibrator used in the transmitter. The characteristics at this time are the characteristics shown in FIG. 25A.

On the other hand, the receiving sensitivity of the vibrator, used in the receiver, may be improved by selecting one in which the resonant frequency $f_a$ of the vibrator on the transmission side is between the resonant frequency $f_a'$ and antiresonant frequency $f_r'$, whereat a sharp impedance change is exhibited, as shown in FIG. 25B.

Utilizing the above criteria, the selection is made so that the driving oscillation frequency $f_{os}$ outputted from oscillator 14 becomes equal to the resonant frequency $f_a$ of the vibrator of the transmitter and so that the resonant frequency $f_a$ is between the resonant frequency $f_a'$ and antiresonant frequency $f_r'$ of the vibrator used in the receiver.

The resonant frequency of the piezoelectric vibrator may be readily altered by changing the thickness of the vibrator, when the vibration in the thickness direction is used, for example. Thus, as a result, the best transmission and receiving efficiencies are achieved, thereby facilitating signal processing and contributing to the stabilizing of operation.

Furthermore, because the power required for driving the transmitter may be less when the receiving signal is kept at a constant level, power consumption may be restricted, for example, in industrial type transmitters driven by 4 mA current.

Figure 26:
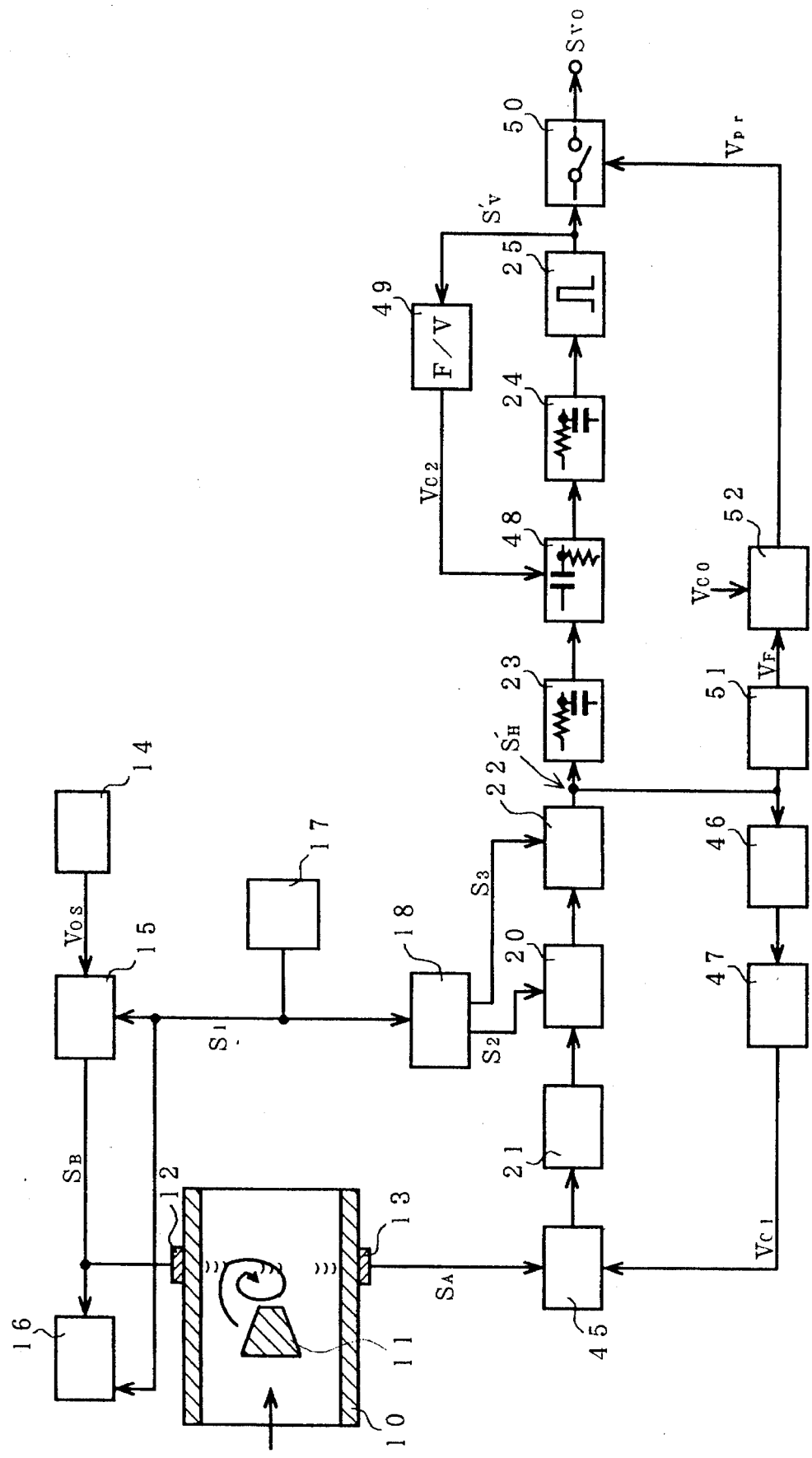
FIG. 26 is a block diagram depicting a circuit which processes the signal from the embodiment of FIG. 5.

Next, additional signal processing steps are used to apply the embodiment of FIG. 5 to actual practice. FIG. 26 shows circuitry which carry out the additional processing steps, and which enable maintenance of long term reliability and increased usage. In FIG. 26, the same components as in FIG. 5 have the same reference characters and description thereof is omitted hereat for clarity of description.

The oscillating voltage $V_{os}$ from oscillator 14 is supplied to transmitter 12 as a burst wave $S_B$ in response to standard signal $S_1$ and is received by receiver 13 after being modulated by a vortex as amplitude modulated signal $S_A$.

The amplitude modulated signal $S_A$ is outputted to an automatic gain amplifier 45 in which a gain is adjusted by a control signal $V_{C1}$ and thereafter, is outputted as half-wave rectified voltage $S_H'$ at the output terminal of peak detecting and half-wave rectifying circuit 22, via tuned amplifier 21, sampling circuit 20, and peak detecting and half-wave rectifying circuit 22. The components 20–22 have the same functions as in FIG. 5.

The half-wave rectified voltage $S_H'$ is outputted to the gain control terminal of automatic gain amplifier 45, as control signal $V_{C1}$, via time constant circuit 46 and DC amplifier 47, to control the gain thereof. The half-wave rectified voltage $S_H$ is also outputted to low-pass filter 23 and a variable high-pass filter 48.

A control signal $V_{C2}$ is inputted to variable high pass filter 48. In this manner, the corner frequency thereof is modified in filter 48 and is outputted to active low pass filter 24. It is then converted into a pulse by Schmitt trigger circuit 25, and the pulse signal is outputted as pulse signal $S_v'$ at the output terminal thereof and applied to circuit 49 which supplies the control signal $V_{C2}$.

Figure 27:
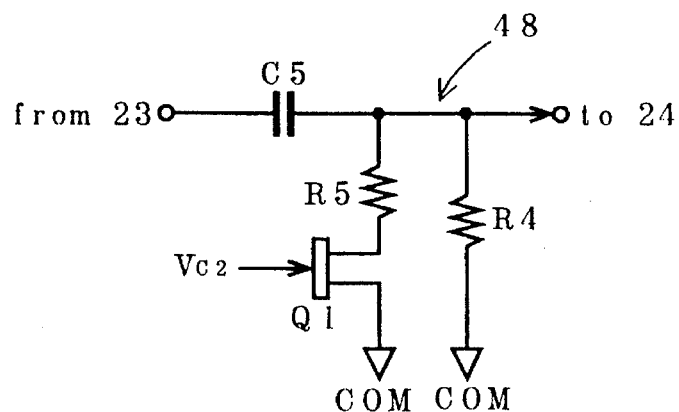
FIG. 27 is a circuit diagram depicting a variable high-pass filter which is used in the embodiment of FIG. 26.

FIG. 27 shows one example of a variable high pass filter 48, wherein the output of low pass filter 23 is inputted to one end of a capacitor $C_5$ and the other end thereof is connected to active low pass filter 24.

The other end of capacitor $C_5$ is connected to a common potential point COM via a resistance $R_4$ and to a common potential point COM via a series circuit comprising a field effect transistor $Q_1$, whose internal resistance is controlled by control voltage $V_{C2}$, and a resistance $R_5$. The corner frequency in the high pass filter 48 is modified by control voltage $V_{C2}$.

Furthermore, the pulse signal $S_v'$ is supplied to circuit 49 which converts it into an analog control signal $V_{C2}$ by a F/V (frequency/voltage) converter 49 to control the corner frequency in the variable high pass filter 48, and to circuit 50 which converts it into a pulse signal $S_{VO}$, which corresponds to the number of vortexes which is outputted at output terminal of switch 50 via a switch whose opening and closing is controlled by a protection signal $V_{pr}$ supplied by comparator 52.

The half wave rectified voltage $S_H'$ is also filtered by a time constant circuit 51 and becomes a filtered signal $V_F$ which is outputted to a comparator 52. Comparator 52 compares filtered signal $V_F$ with a comparison signal $V_{CO}$ to output protection signal $V_{pr}$ at its output terminal to open and close switch 50.

The operations of the additional parts of the embodiment of FIG. 26 will now be explained with reference to FIGS. 28A–28C.

The function of automatic gain amplifier 45 is as follows. The fluctuation in the level of receiving caused by elapsed changes, temperature characteristics, etc, of the piezoelectric vibrators or that caused by acoustic impedance of the fluid, or by particles and bubbles, lead to a change of detecting efficiency in the peak detecting and half-wave circuit 22.

The gain of automatic gain amplifier 45 is controlled by control voltage $V_{C1}$ (which corresponds to $A_m$) obtained by filtering the half-wave rectified voltage $S_H'$ (see FIG. 28A) using time constant circuit 46 to keep constant the amplitude of the voltage input to the peak detecting and half-wave rectifying circuit 22.

The function of variable high pass filter 48 is as follows. When the fluid to be measured has a high velocity flow, a low frequency noise frequency $f_L$ called a "fluctuation noise" appears superimposed on the vortex frequency $f_v$. This causes an error when the vortex frequency $f_v$ is converted into a pulse by Schmitt trigger circuit 25. Then, when the flow velocity is high (i.e. when the vortex frequency is high), the corner frequency is increased by control signal $V_{C2}$ to reduce the low frequency noise component.

The output protecting circuit, which comprises time constant circuit 51, comparator 52, switch 50, etc, operates as follows. The output largely fluctuates at the receiving level, i.e. at the beginning of the feeding of the fluid, or when it is stopped due to the remaining air or air which flows in. Furthermore, because the gain of the circuit is large when no fluid exists in the pipe, noises which are irrelevant to the vortex frequency are superimposed on the half-wave rectified voltage $S_H'$ in the peak detecting and halfwave rectified circuit 22.

In such case, the vortexes are not adequately emitted and normally the output becomes zero in a method other than the ultrasonic detecting method. In the embodiment of FIG. 5, the receiving level sharply drops. Because the change at this time takes place abruptly, a time constant of the time constant circuit 51 is set to be smaller than that of the time constant circuit 46.

Figure 28:
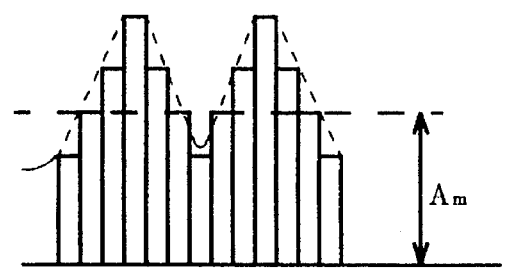
FIGS. 28A–28C are waveform charts of waves at different parts of the circuit of FIG. 26 and useful for explaining operation thereof.
Figure 28:
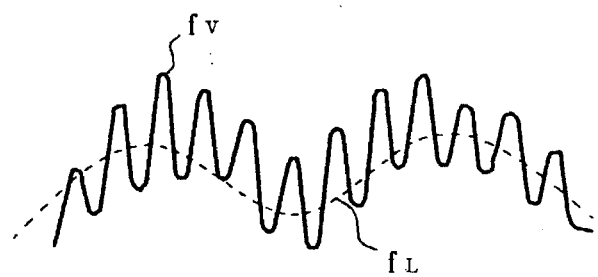
Figure 28:
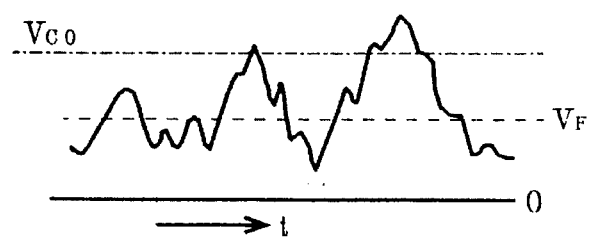

Accordingly, the stability is improved by removing the half-rectified voltage $S_H'$ as filtered signal $V_F$ through time constant circuit 51, by comparing filtered signal $V_F$ in comparator 52 which is set at the predetermined comparison signal $V_{CO}$ as shown in FIG. 28C and by causing switch 50 to be turned OFF by protecting signal $V_{pr}$ when the filtered signal $V_F$ drops below comparison signal $V_{CO}$.

Figure 29:
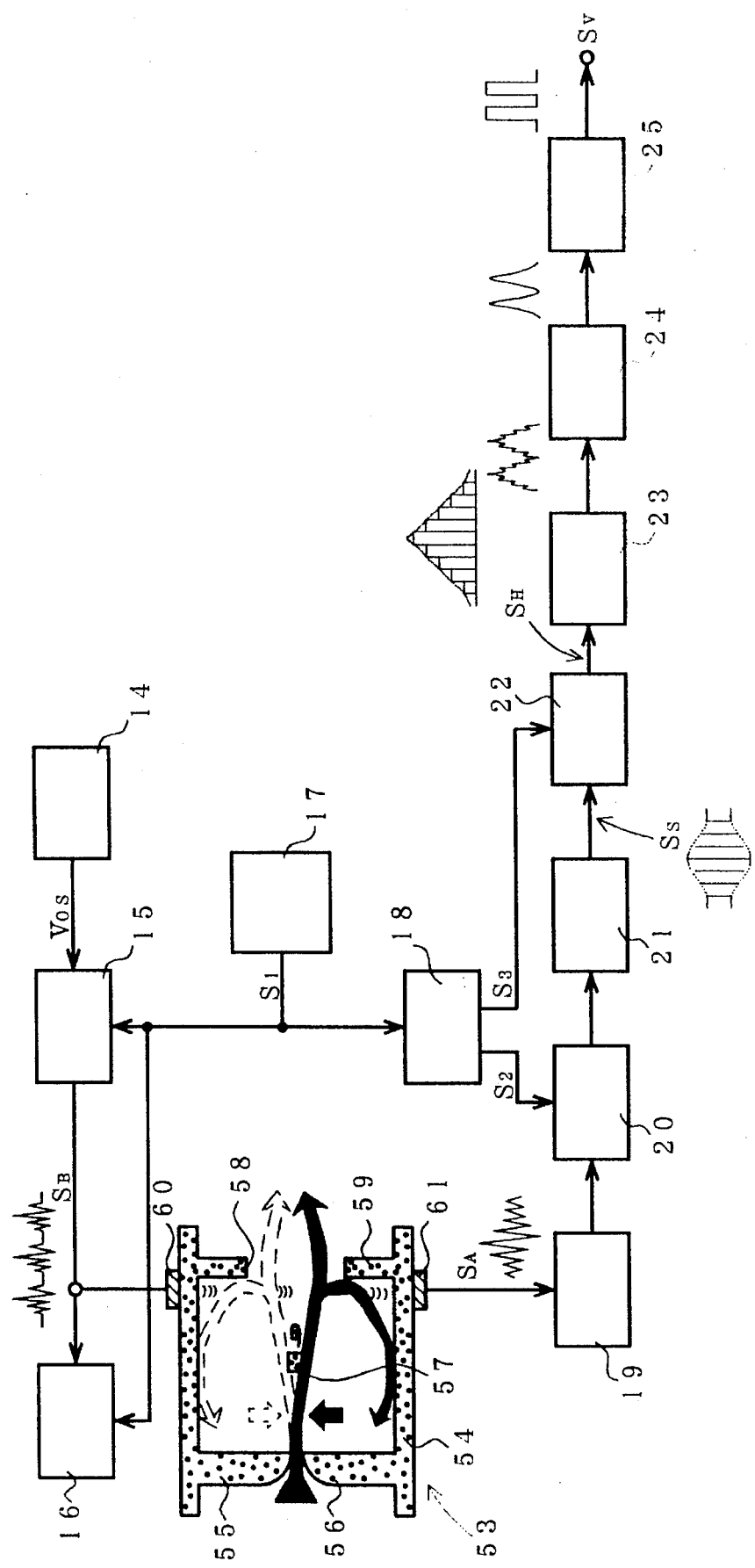
FIG. 29 is a block diagram depicting another illustrative embodiment of the invention wherein the sensor section is modified.

FIG. 29 depicts another illustrative embodiment wherein a sensor section is modified so that a fluid vibration (or also called a fluidic) sensor is used in the sensor section 53. Because the circuit parts other than the sensor part, are the same as in FIG. 5, the discussion hereat will be mainly of the sensor section 53.

A through hole is bored at the center part of a block plate 56 which functions as a nozzle 55 on the upstream side of a metallic pipe 54 and a target 57 is fixed at a position in the pipe 54 whereat a jet of fluid to be measured is jetted through nozzle 55 and hits. A block plate 59 having a through hole 58 larger than nozzle 55, more or less, is provided on the downstream side of target 57 to block pipe 54. A transmitter 60 and receiver 61 are disposed facing each other on the outer wall of pipe 54. The fluid is applied through nozzle 55 and is caused to jet and hit target 57 on the downstream side, and then flows toward the underside of target 57 (shown by the black flow line) for example as its flow path is changed. This flow hits the wall of block plate 59, and then is fed back to block plate 56 as an under side feed back flow and pushes up the jet from nozzle 55 toward the opposite direction (shown by the arrow).

As a result, the jet flows toward the upper side of target 57 (shown by the dotted line). This flow hits the wall of block plate 59. It is fed back to the block plate 56 side as an upper side feed back flow and pushes down the jet from the nozzle 55 toward the opposite direction (shown by the dotted line).

Then, the jet moves toward the under side of target 57. The above action is repeated to cause fluid vibration. Then, a burst wave is irradiated into this fluid vibration from transmitter 60 and an ultrasonic signal modulated by this fluid vibration is received by receiver 61. Then, the signal processing shown in FIG. 5 is carried out to output the number of fluid vibrations, i.e. the vibration frequency $f_v$.

This vibration frequency $f_v$ has the relationship of $f_v = KQ$, wherein K is a constant, with the flow rate Q of the fluid to be measured being in a wide range of Reynolds numbers. This enables the construction of a flowmeter having excellent characteristics and low Reynolds number, i.e. a low flow rate.

Although in FIG. 29 the ultrasonic transmitter 60 and ultrasonic receiver 61 are fixed, for example, by clamping thereof onto pipe 54, on the upstream side of block plate 59, the positions of transmitter 60 and receiver 61 are not limited to those described above, and they may be disposed so that the propagation path of the ultrasonic signal agrees with the position where the fluid vibration is generated.

The foregoing embodiments of the invention produce the following and other advantages and outstanding effects.

According to the invention described in Claims 1 and 2, the ultrasonic signal is intermittently transmitted to the Karman vortex as a burst wave and the signal is sampled only in the area of the time when the signal modulated by the Karman vortex appears, so that the flow rate is measured without being influenced by noise existing as a standing wave in the pipe. The invention is suitable for measuring liquids without being influenced by the vibration of the pipe and enables measurement of low flow velocity.

Because the transmitter and receiver are clamped on the outside of the fluid carrier or pipe, they do not contact the fluid. Thus, there are no leaks of the fluid at the parts whereat are located the transmitter and receiver, which contributes to the improvement in reliability and enables simple on-line maintenance. According to the invention described in Claim 3, linearity may be obtained in a wide range of Reynolds numbers, and a fluid vibrating flowmeter having good flow rate characteristics especially in low Reynold number, i.e. in low flow rate range, may be obtained in addition to the effects described with reference to Claim 1.

According to the invention described in Claim 4, a tuned amplifier having a low Q value is provided in the signal processing circuit, so that the ultrasonic signal may be suitably selected and amplified and so that waves are successively outputted exceeding the predetermined number of waves of the oscillating frequency contained in the gate width $W_1$ thereby influencing the next signal processing.

According to the invention described in Claim 5, the oscillation frequency is set at the portion where impedance change of the receiver is large, so that the vortex signal is efficiently received.

According to the invention described in Claim 6, the structure of the transmitter is modified so as to be set to be equal to the resonant frequency of the transmitter in addition to the structure of the invention recited in Claim 5, so that the vortex signal may be more efficiently received, According to the invention described in Claim 7, the vibrator is fixed in the holder of the transmitter and receiver through the intermediary of an elastic body, the detecting sensitivity is prevented from becoming degraded due to the fixing of the vibrator, and the sensitivity is improved.

According to the invention described in Claim 8, the inner walls of the pipe facing the transmitter and receiver are formed to be parallel to each other, so that the loss of energy accompanying the transmission and receiving of the ultrasonic signals is reduced and the ultrasonic signals are transmitted and received efficiently.

According to the invention described in Claim 9, the ultrasonic transmitter and receiver are fixed to adapters having flat transmission and receiving surfaces, so that they are effectively applied especially to pipes having small bore diameters, in addition to the other effects described with reference to Claim 8.

According to the invention described in Claim 10, the reflecting surfaces for reflecting the leaked ultrasonic signals propagating in the pipe is provided on the outer surface of the measuring pipe, so that a degree of freedom of frequency of sampling may be widened in processing the signals and a margin is provided even for changes of propagating signals based on the changes of sound velocity, thereby enabling the maintenance of a good signal to noise ratio.

According to the invention described in Claim 11, the oscillation frequency of the oscillator is switched to the area of the thickness direction vibration frequency and thickness shearing direction, so that the ultrasonic signals are prevented from being attenuated due to such foreign matters as bubbles and particles, even when such bubbles and particles are mixed in the fluid being measured for flow rate, and so that a stable receiving level is maintained.

According to the invention described in Claim 12, a plurality of piezoelectric vibrators having different vibration frequencies are used, so that a degree of freedom for dealing with the attenuation of ultrasonic signals caused by foreign matters mixed in the fluid, is thereby improved and more stable receiving level is maintained.

According to the invention described in Claim 13, the amplitude modulated signal is received through the intermediary of automatic gain amplifying means whose degree of amplification is controlled by a first control signal, so that the detecting efficiency is prevented from dropping due to the changes of receiving level and the stability is enhanced considerably.

According to the invention described in Claim 14, the signal processing is carried out using a variable high pass filter for filtering the demodulated signal so that a low frequency "fluctuation" component which is superimposed on the vortex signal frequency when the flow velocity is high, may be reduced. This invention enables the expansion of its application range to various applications.

According to the invention described in Claim 15, the comparing means which outputs the protection signal is added, so that significant fluctuation of receiving level which is brought about at the beginning of feeding of water, for example, may be detected when it occurs and the output may be turned OFF, thereby enabling the ready maintenance and further general use thereof.

According to the invention described in Claim 16, the transmitting piezoelectric vibrator is fixed on the measuring pipe by clamping to thereby intermittently transmit burst wave ultrasonic signals, and the receiving piezoelectric vibrator is selected so that the oscillation frequency is between the resonant frequency and the antiresonant frequency thereby to detect the amplitude modulated wave generated by the fluid vibration by holding the peak with a predetermined timing, so that the vortex signal is efficiently received and the reliability is improved without being influenced by various noises, and without being influenced by the vibration of the pipe, and by eliminating leakage of fluid being measured. In addition, the invention so described enables use of on-line maintenance.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. An ultrasonic fluid vibrating flowmeter for measuring a flow rate of a fluid to be measured by applying ultrasonic signals to said fluid to cause a fluid vibration and by receiving an output signal comprising said ultrasonic signal as modulated by said fluid vibration, said flowmeter comprising a set of ultrasonic transmitter and ultrasonic receiver mounted on a measuring pipe line through which said fluid to be measured for flow rate travels, said transmitter and receiver being disposed so as to not contact said fluid;

driving means for intermittently driving said ultrasonic transmitter with burst waves containing an oscillation frequency;

standard timing means for generating a standard signal for controlling timing of said burst waves;

sampling signal generating means for generating a sampling signal which is synchronized with said standard signal and whose sampling time is changed by a function of a diameter of said measuring pipe line and a sound velocity of said fluid;

sampling means for sampling an amplitude modulated signal, whose amplitude is modulated by frequency modulation caused by said fluid vibration, in said ultrasonic receiver by means of said sampling signal; and filtering means for determining an envelope of said amplitude modulated signal sampled by said sampling means to thereby detect a vibration frequency of said fluid vibration from said envelope.

2. The flowmeter of claim 1, comprising vortex generator means provided in said measuring pipe line for generating a Karman vortex on the downstream side thereby to cause said fluid vibration.

3. The flowmeter of claim 1, comprising means for supplying a jet of said fluid through a nozzle to hit a target provided on a downstream side of said nozzle to thereby cause said fluid vibration.

4. The flowmeter of claim 1, 2 or 3, further comprising a tuned amplifier having a low Q value positioned adjacent said sampling means.

5. The flowmeter of claim 1, 2 or 3, wherein said oscillation frequency is between a resonant frequency and an antiresonant frequency of said ultrasonic receiver.

6. The flowmeter of claim 1, 2 or 3, wherein said oscillation frequency is equal to a resonant frequency of said ultrasonic transmitter and is between a resonant frequency and an antiresonant frequency of said ultrasonic receiver.

7. The flowmeter of claim 1, 2 or 3, wherein said ultrasonic receiver comprises a vibrator, a holder, and an elastic body, said vibrator being fixed to said holder through the intermediary of said elastic body.

8. The flowmeter of claim 1, 2 or 3, wherein said measuring pipe line comprises opposite inner wall surfaces which are parallel to each other and wherein said set of ultrasonic transmitter and ultrasonic receiver are disposed on the outside of said measuring pipe line opposite said inner wall surfaces.

9. The flowmeter of claim 1, 2 or 3, further comprising adapters fixed to said measuring pipe line; and wherein said ultrasonic transmitter and ultrasonic receiver are fixed to said adapters.

10. The flowmeter of claim 1, 2 or 3, wherein reflecting surfaces are provided adjacent said set of ultrasonic transmitter and ultrasonic receiver, for reflecting leaked ultrasonic propagating waves propagating through said measuring pipe line.

11. The flowmeter of claim 1, 2 or 3, wherein said ultrasonic transmitter and said ultrasonic receiver, each comprises a piezoelectric vibrator, said piezoelectric vibrator having a thickness direction vibration and a thickness shearing direction vibration, and further comprising an oscillator means for generating an output having said oscillation frequency, said oscillation means switching to about the frequency of said thickness direction vibration and the frequency of said thickness shearing direction vibration.

12. The flowmeter of claim 1, 2 or 3, wherein a plurality of sets of piezoelectric vibrators having different vibration frequencies are used in said sets of ultrasonic transmitter and ultrasonic receiver, thereby to generate ultrasonic signals having said oscillation frequency.

13. An ultrasonic fluid vibrating flowmeter for measuring a flow rate of a fluid to be measure by supplying ultrasonic signals to said fluid to cause a fluid vibration and by receiving an input signal comprising said ultrasonic signal as modulated by said fluid vibration, said flowmeter comprising a set of ultrasonic transmitter and ultrasonic receiver mounted on a measuring pipe line through which said fluid flows and disposed so as to not contact said fluid, said ultrasonic transmitter and said ultrasonic receiver transmitting and receiving said ultrasonic signals;

driving means for intermittently driving said ultrasonic transmitter with burst waves containing an oscillation frequency;

standard timing means for generating a standard signal for controlling timing of said burst waves;

sampling signal generating means for generating a sampling signal which is synchronized with said standard signal and whose sampling time is changed by a function of a diameter of said measuring pipe line and a sound velocity of said fluid;

automatic gain amplifying means, under control of a first control signal, for amplifying an amplitude modulated signal obtained from said ultrasonic receiver and for outputting an amplified modulated signal;

demodulating means for sampling and demodulating said amplified modulated signal using said sampling signal and for outputting a demodulated signal; and feedback means for feeding back a signal obtained by filtering DC components contained in said demodulated signal as said first control signal to detect a vibration frequency of said fluid vibration from an envelope of said demodulated signal.

14. The flowmeter of claim 13, comprising a variable high pass filter, wherein a corner frequency is controlled by a second control signal, to filter said demodulated signal; and frequency and voltage converting means for converting an output frequency from said variable high pass filter to said second control signal.

15. The flowmeter of claim 13, comprising comparing means for comparing a filtered signal obtained by filtering said DC components contained in said demodulated signal with a predetermined comparison signal; and for outputting a protection signal which turns OFF the output when said filtered signal is smaller than said comparison signal to thereby turn OFF a vibration frequency appearing in said output.

* * * * *